United States Patent
Fedeli

(10) Patent No.: US 6,542,060 B2
(45) Date of Patent: Apr. 1, 2003

(54) MICROCOMPONENT OF THE MICROINDUCTOR OR MICROTRANSFORMER TYPE

(75) Inventor: Jean-Marc Fedeli, Saint Egreve (FR)

(73) Assignee: Memscap (FR)

( * ) Notice: Subject to any disclaimer, the term of this patent is extended or adjusted under 35 U.S.C. 154(b) by 0 days.

(21) Appl. No.: 09/943,604

(22) Filed: Aug. 30, 2001

(65) Prior Publication Data

US 2002/0047769 A1 Apr. 25, 2002

(30) Foreign Application Priority Data

Sep. 12, 2000 (FR) .............................. 00 11577

(51) Int. Cl.$^7$ ................................ H01F 5/00
(52) U.S. Cl. ..................... 336/174; 336/200; 336/223; 336/232
(58) Field of Search ................. 336/223, 200, 336/232, 174, 175

(56) References Cited

U.S. PATENT DOCUMENTS

| | | | |
|---|---|---|---|
| 5,296,992 A | * 3/1994 | Abe | 360/126 |
| 5,995,342 A | * 11/1999 | Cohen et al. | 360/126 |
| 6,104,275 A | 8/2000 | Maeda | |
| 6,414,564 B1 | * 7/2002 | Mizoguchi et al. | 333/35 |

FOREIGN PATENT DOCUMENTS

EP 0 725 407 A1 7/1996

OTHER PUBLICATIONS

Antonov A S et al., "The High–Frequency Magneto–Impedance of a Sandwich with Transverse Magnetic Anisotropy" Journal of Physics D. Applied Physics, IOP Publishing, Bristol, GB, vol. 32, No. 11, Jun. 7, 1999, pp. 1204–1208.
Miyazaki T et al., "Spin Tunneling in NI–FE/AL2O3/CO Junction Devices (Invited)" Journal of Applied Physics, US, American Institute of Physics. New York, vol. 81, no., Part 02A, Apr. 15, 1997, pp. 3753–3757.

* cited by examiner

*Primary Examiner*—Anh Mai
(74) *Attorney, Agent, or Firm*—Wall Marjama & Bilinski LLP

(57) ABSTRACT

Inductive microcomponent (1), such as a microinductor or microtransformer, comprising a metal winding (2) having the shape of a solenoid, and a magnetic core (4) including a strip made of a ferromagnetic material, positioned at the center of the solenoid (2), and characterized in that the core comprises at least one additional strip made of a ferromagnetic material (13), separated from the other strip (12) by a spacer layer (14) made of a non-magnetic material, the thickness of which is such that the strips (12, 13) located on either side of the spacer layer (14) are antiferromagnetically coupled.

6 Claims, 3 Drawing Sheets

MICROCOMPONENT OF THE MICROINDUCTOR OR MICROTRANSFORMER TYPE

TECHNICAL FIELD

The invention relates to the field of microelectronics and, more specifically, to the sector for fabricating microcomponents, especially those intended to be used in radio-frequency applications. More specifically, it relates to microcomponents such as microinductors or microtransformers equipped with a magnetic core allowing operation at particularly high frequencies.

PRIOR ART

As is known, electronic circuits used for radio-frequency applications, especially such as mobile telephony, comprise oscillating circuits including capacitors and inductors.

Given the trend towards miniaturization, it is essential that microcomponents such as microinductors occupy an increasingly small volume, while keeping a value of inductance which is high enough and a high quality coefficient.

Moreover, the general trend is towards increasing operating frequencies. Thus, mention may be made by way of example of the frequencies used in the new UMTS standards of mobile telephony, which are in the region of 2.4 gigahertz, in comparison with the frequencies of 900 and 1800 megahertz used for the GSM standard.

The increase in operating frequencies poses problems relating to the behaviour of magnetic cores of microinductors.

This is because, in order to obtain a good quality factor, an increase in the inductance of the microinductor is generally sought. To this end, magnetic materials are chosen, the geometry and dimensions of which enable the greatest possible permeability to be obtained.

However, given the phenomena of gyromagnetism, it is known that the permeability varies according to the frequency and, more specifically, that there is a resonant frequency beyond which an inductor has capacitative behaviour. In other words, a microinductor absolutely must be used at frequencies below this resonant frequency.

However, increasing the frequencies of use therefore comes up against the phenomenon of gyromagnetic resonance, which, for a given geometry, limits the frequency range in which the inductor can be used in an optimal manner.

A problem for which the invention proposes a solution is that of limiting the frequency of use inherent to the existence of a phenomenon of gyromagnetism.

SUMMARY OF THE INVENTION

The invention therefore relates to an inductive microcomponent, such as a microinductor or microtransformer, comprising a metal winding having the shape of a solenoid, and a magnetic core including a strip made of a ferromagnetic material, positioned at the centre of the solenoid.

This microcomponent is characterized in that the core comprises at least one additional strip made of a ferromagnetic material, separated from the other strip by a spacer layer made of a non-magnetic material, the thickness of which is such that the strips located on either side of the spacer layer are antiferromagnetically coupled.

In other words, the two ferromagnetic strips of the core act one on the other through the spacer layer in such a way that the magnetizations of each of these strips are oriented in the same direction, but in opposite senses one with respect to the other. This antiferromagnetic coupling therefore opposes the rotation of magnetizations when an external field is applied. This resistance to the rotation of magnetizations results in a decrease of the intrinsic permeability of the ferromagnetic material taken in isolation. This is because, when the magnetization of a magnetic domain of one of the strips is subjected to an external magnetic field, the magnetization of the facing domain on the other strip interacts thereby limiting the rotation of the first magnetization.

The decrease in the magnetic permeability of each strip results in a decrease in the inductance of the microcomponents. It has been noticed that this drawback was compensated for by the increase in the gyromagnetic resonant frequency, corresponding to the maximum frequency at which the microcomponent retains its inductive behaviour.

As is known, the magnetic permeability is a complex quantity in which the real part represents the effective permeability ($\mu'$), while the imaginary part ($\mu''$) represents the losses. The gyromagnetic resonant frequency is given by the following expression:

$$fres = \frac{\gamma}{2\pi}\sqrt{(H_k + N \cdot 4\pi M_s)(H_k + 4\cdot \pi M_s)}$$

in which:

N is the demagnetizing field coefficient, $\gamma$ is the gyromagnetic constant, $H_k$ is the value of the anisotropy field, and $M_s$ is the value of the magnetic moment at saturation.

It is therefore found that the resonant frequency increases with the value of the anisotropy field which orients the magnetic domains along the easy axis.

Thus, the presence of the second strip is comparable to increasing the value of the anisotropy field which characterizes the difficulty in imposing a rotation on the various magnetizations. The increase in the anisotropy field therefore implies, using the formula above, an increase in the resonant frequency. It is therefore possible to use the microinductor or the microtransformer according to the invention at higher frequencies than for the existing components.

In practice, the magnetic core may consist of a stack of a plurality of ferromagnetic strips separated by non-magnetic spacer layers, the strips located on either side of each spacer layer being antiferromagnetically coupled.

This is because, in order to obtain the antiferromagnetic coupling phenomenon, the spacer layer must be particularly thin, of the order of a nanometer, which requires a stack of more than about ten ferromagnetic layers in order to obtain inductances which are high enough.

In practice, each ferromagnetic strip has an easy magnetization axis which is preferably oriented perpendicularly to the axis of the solenoid. Such an orientation is obtained by applying a magnetic field perpendicular to the axis of the solenoid, while the material constituting the ferromagnetic strips is being deposited.

In practice, the spacer layer may be either a conductor, or even an isolator. From among the preferred conductors, copper, gold, silver, chromium and the metal alloys from these metals will especially be chosen. With regard to the insulators intended to form the spacer layers, silica, aluminium and silicon nitride may for example be used. The ferromagnetic materials used may be especially cobalt, iron, nickel-iron or cobalt-iron.

BRIEF DESCRIPTION OF THE FIGURES

The manner of embodying the invention together with the advantages which result therefrom will emerge clearly from the description of embodiments which follow supported by the appended figures, in which.

MANNER OF EMBODYING THE INVENTION

As already stated, the invention relates to microcomponents such as microinductors or microtransformers, the magnetic core of which comprises several ferromagnetic strips separated by non-magnetic spacer layers, the thickness of which is determined such that the adjacent ferromagnetic strips are coupled antiferromagnetically.

Figure 1:
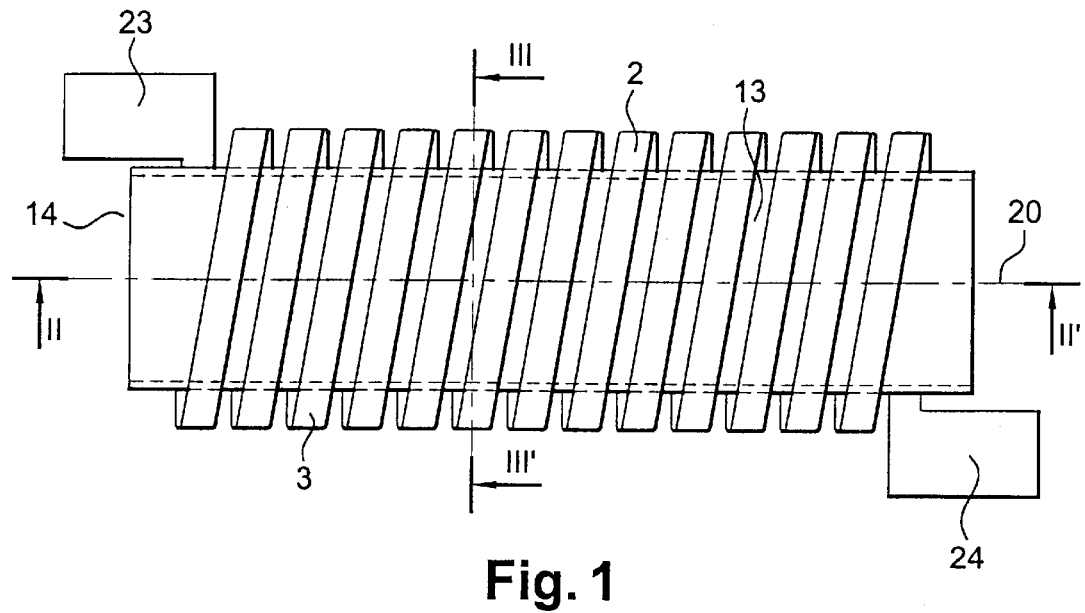
FIG. 1 is a schematic top view of a microinductor made according to the invention.
Figure 2:
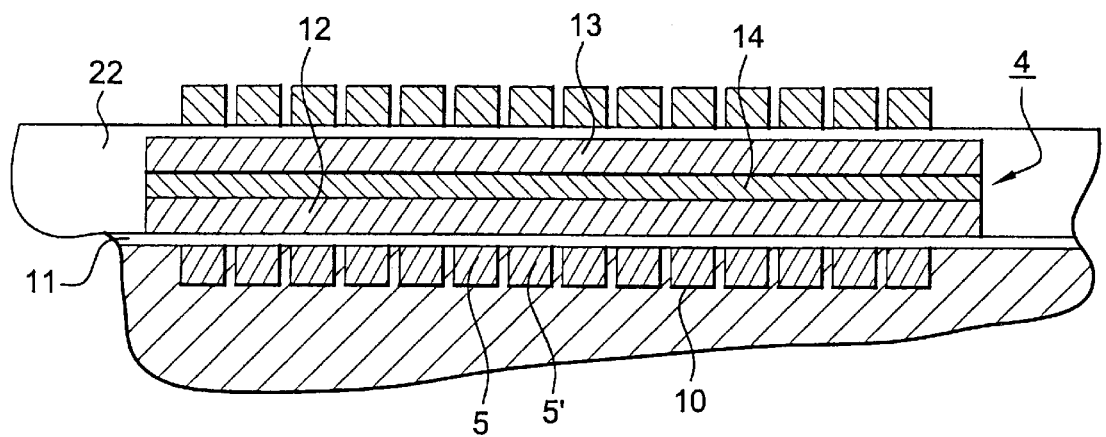
FIG. 2 is a view in longitudinal section along the plane II—II' of FIG. 1.

Thus, as illustrated in FIGS. 1 and 2, the microinductors (1) according to the invention comprise a metal winding (2) consisting of a plurality of turns (3) wound around the magnetic core. More specifically, each turn (3) of the solenoid comprises a lower part (5) which is inserted on the surface of the substrate (6) and a plurality of arches (7) connecting the ends (8; 9) of the adjacent lower parts (5, 5').

In order to obtain such an inductor, a plurality of parallel channels (10) are etched on the upper face of an insulating substrate or an insulating layer on a conducting or semiconducting substrate (6). The lower parts (5) of each turn are obtained by electrolytic growth of copper, then the surface of the substrate (6) is planarized in order to produce an optimal surface condition. Next, a layer of silica (11) is deposited on top of the upper face of the substrate (6) so as to insulate the lower parts (5) of the turns from the materials used for the magnetic core.

Figure 3:
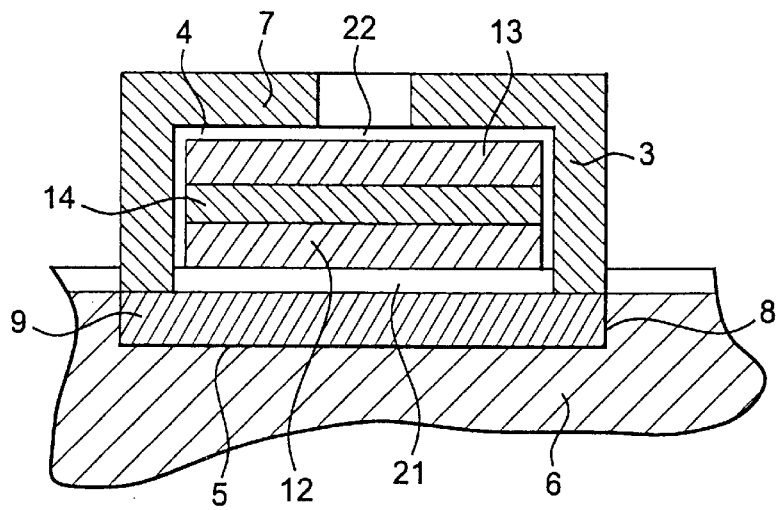
FIG. 3 is a view in transverse section along the plane III—III' of FIG. 1.

The magnetic core (4) is then made. As already said, the magnetic core (4) may comprise a large number of stacked ferromagnetic strips and the invention is not limited to the embodiment illustrated in the drawings, for which the number of ferromagnetic strips is low in order to facilitate the representation. Thus, the core (4) of FIG. 3 comprises two ferromagnetic strips (12, 14) between which the spacer layer (13) is located.

More specifically, in order to make the ferromagnetic layer (12), the sputtering technique is chosen, which makes it possible to obtain controlled thicknesses.

The thickness of each ferromagnetic strip is chosen between 1 and 10 nanometers. The number of ferromagnetic strips is chosen to obtain an inductance which is high enough.

As already said, in order to ensure anisotropy in the ferromagnetic strip (12), deposition is carried out by sputtering while subjecting the region of application to a magnetic field oriented parallel to the plane of the substrate, and perpendicularly to the axis of the solenoid.

Next, a non-magnetic spacer layer (14) is deposited, which layer could be metallic or even insulating. This deposition is carried out by sputtering a conducting metal such as copper, silver, gold or chromium.

Next, a second ferromagnetic strip (13) is deposited above the spacer layer. Although not corresponding to the representation in FIG. 2, it is then possible to repeat the operations of depositing the spacer layer, then an additional ferromagnetic strip as many times as needed in order to make the magnetic core (4).

After having made the magnetic core assembly (4), a layer of silica (22), intended to electrically insulate the magnetic core (4) from the upper part (7) of the turns (2), is deposited. Subsequently, electrolytic deposition of copper is carried out in order to form arches (7) connecting the opposite end of the adjacent lower parts (5–5'), in order to produce the microcomponent illustrated in FIG. 1.

Subsequent steps for creating connection pads and a possible passivation can be carried out.

The choice of materials used for the ferromagnetic strips (12, 13) and the spacer layer (14), together with the thickness of the latter, are determinant in obtaining the antiferromagnetic coupling phenomenon between the ferromagnetic strips.

Figure 6:
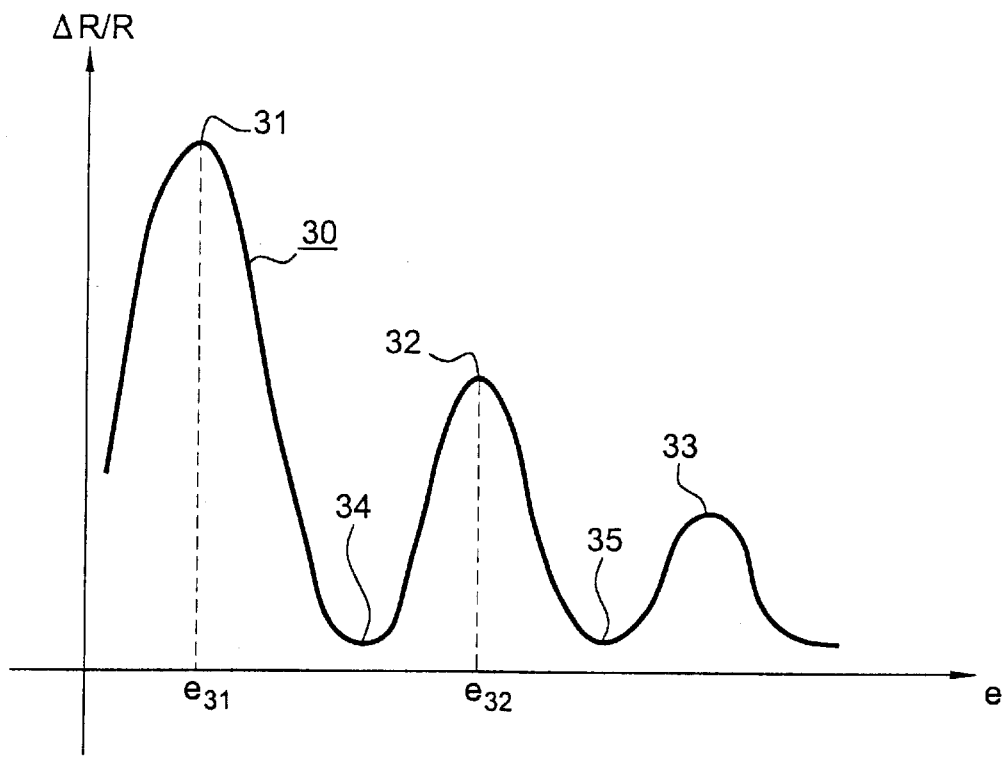
FIG. 6 is a graph illustrating the variation of the ferromagnetic coupling according to the thickness of the spacer layer.

FIG. 6 shows a typical curve (30) illustrating the change in magnetic coupling between the ferromagnetic strips according to the thickness (e) of the spacer layer (14). To illustrate the variation of the magnetic coupling, measurements carried out within the scope of development on giant magnetoresistors are referred to. This is because it is known that in an assembly formed from ferromagnetic layers separated by a non-magnetic spacer layer, a significant decrease in the resistivity is observed on application of a magnetic field. When the magnetic field is applied to such a structure, the magnetizations of the ferromagnetic layers rotate progressively in the direction of the applied field and all align themselves parallel to the latter when it becomes greater than the saturation field. This relative change of orientation of the magnetizations in the successive ferromagnetic layers is accompanied by a very large decrease in the electrical resistance of the assembly. The resistance is lower when the magnetizations are parallel than when they are antiparallel. The magnitude of the magnetoresistance corresponds to the change in resistivity between when the applied field has a zero value and has the saturation value.

FIG. 6 shows the variation in this magnetoresistance magnitude according to the thickness (e) of the spacer layer. A variation in the magnetoresistance magnitude is noticed, which has maxima (31-33) corresponding to configurations in which the ferromagnetic layers are antiferromagnetically coupled, while the minima (34, 35) correspond to ferromagnetic coupling situations.

In other words, in the cores according to the invention, the thickness of the spacer layer corresponding to a peak (31, 32, 33) on the curve of FIG. 6 is chosen, that is to say corresponding to an antiferromagnetic coupling configuration.

Where there are several magnetoresistance peaks (31, 32), as is the case in FIG. 6 corresponding to the choice of cobalt as ferromagnetic layer and of copper as spacer layer, the thickness of the spacer layer will be chosen as a function of the chosen application. This is because, since the antiferromagnetic coupling is stronger for the smaller thickness ($e_{31}$), a smaller core magnetic permeability is observed at the first peak (31) than for the second peak (32), but on the other hand, a higher resonant frequency is observed for the gyromagnetic effect. The choice of thickness ($e_{31}$, $e_{32}$) will therefore be made according to the type of inductor or microtransformer desired.

Figure 4:
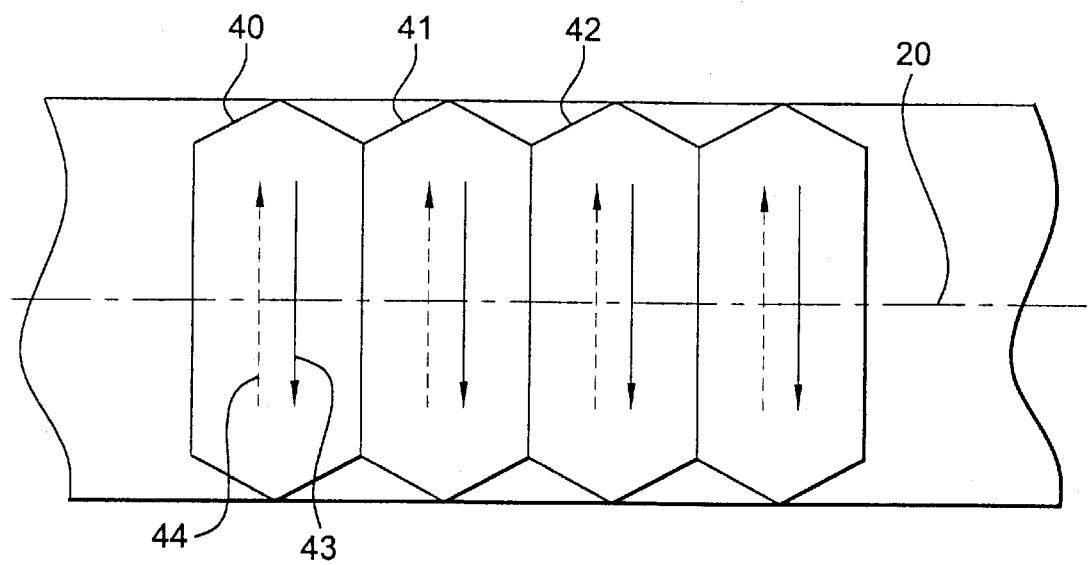
FIGS. 4 and 5 are diagrams explaining the orientation of the magnetizations of the magnetic domains.
Figure 5:
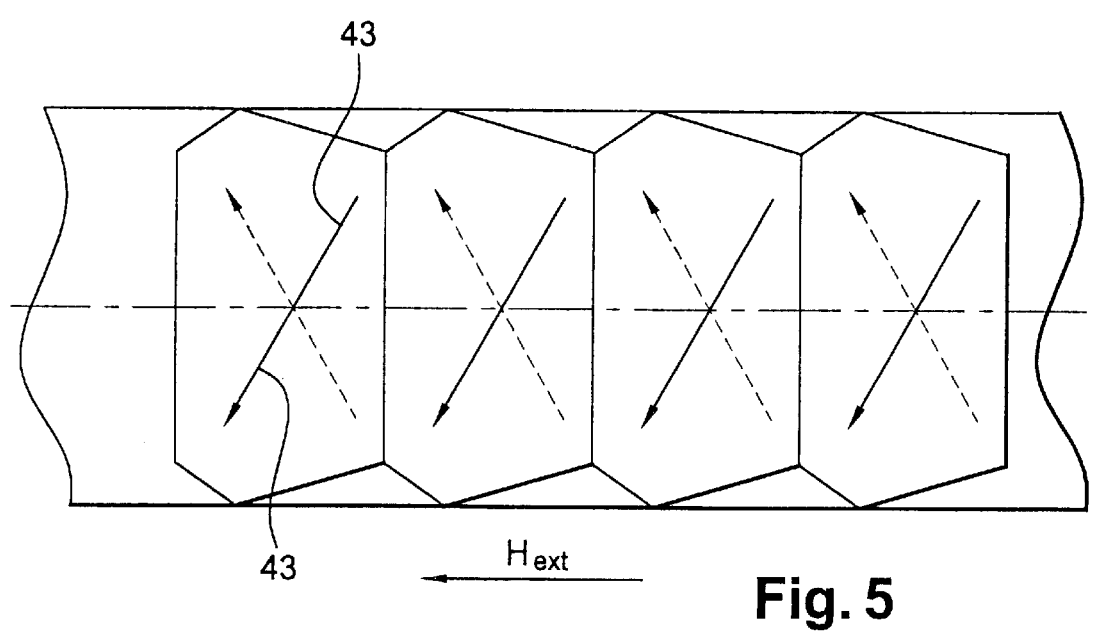

The antiferromagnetic coupling existing between two adjacent ferromagnetic strips is illustrated in FIGS. 4 and 5. Thus, in the top strip, the magnetic domains (40–42) have the approximate shape illustrated in FIG. 4. It can be seen that the magnetization illustrated by an arrow (43) in bold line is oriented perpendicularly to the axis (20) of the solenoid, corresponding to the large dimension of the strip. The antiferromagnetic coupling is physically embodied by the antiparallel orientation of the magnetization of the magnetic domains of the lower strip. This magnetization is illustrated by an arrow (44) in dotted line in the sense opposite to the magnetization (43) of the top strip.

When a magnetic field $H_{ext}$ is applied parallel to the axis of the solenoid, the magnetizations (43, 44) tend to orient themselves in the direction of this external field $H_{ext}$, as illustrated in FIG. 5.

Figure 7:
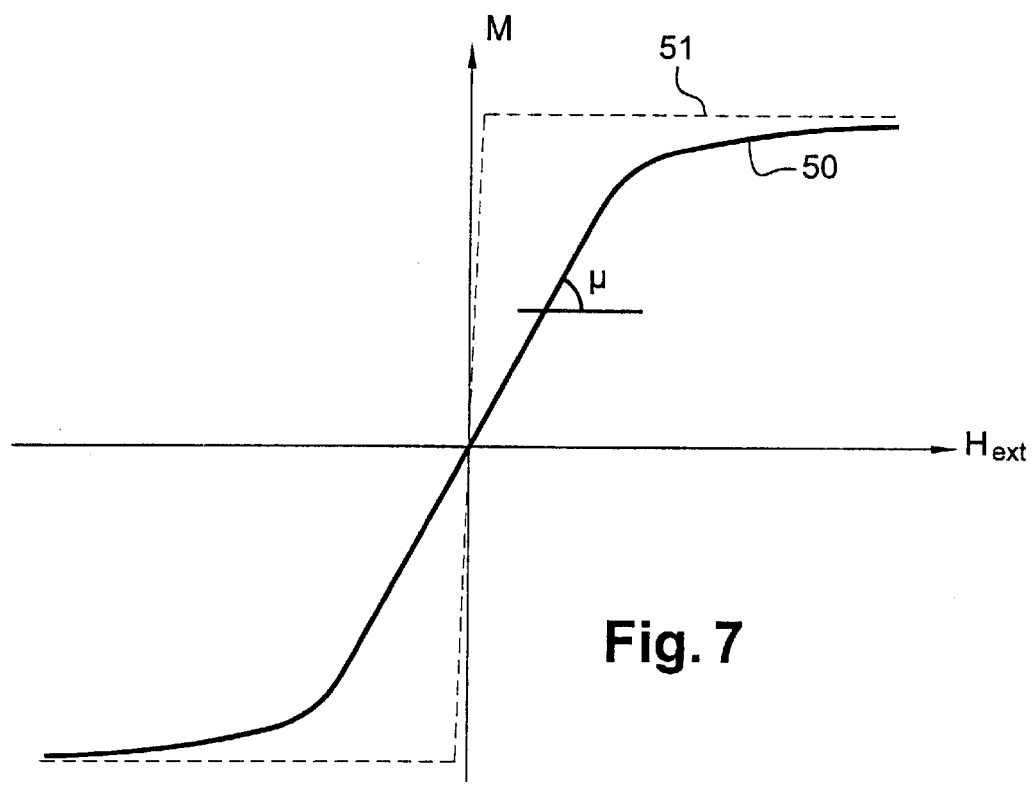
FIG. 7 is a schematic graph illustrating the variation of the magnetization according to the external applied field, for antiferromagnetic and ferromagnetic materials.

The magnetic domains are deformed concomitantly on the two strips. The effect of the magnetizations of one strip on the other (corresponding to antiferromagnetic coupling) produces a variation of the overall magnetization M as a function of the applied field $H_{ext}$ shown by the curve in solid line of FIG. 7. This curve has a slope, giving the permeability ($\mu$), which slope is shallower than that of the curve (51) illustrated in dotted line corresponding to a ferromagnetic material for which the saturation is reached for considerably lower excitation fields.

Although the invention is described in more detail with regard to microinductors, it goes without saying that the production of microtransformers, with several windings wound around a common core, is also covered by the invention.

It emerges from the above that the microcomponents according to the invention have multiple advantages and, in particular, they increase the maximum operating frequency compared with microcomponents of identical size and material.

These microcomponents find a very specific application in radio-frequency applications and, especially, in mobile radiotelephony.

What is claimed is:

1. Inductive microcomponent (1), such as a microinductor or microtransformer, comprising a metal winding (2) having the shape of a solenoid, and a magnetic core (4) including a strip (12) made of a ferromagnetic material, positioned at the centre of the solenoid (2), characterized in that the core comprises at least one additional strip (13) made of a ferromagnetic material, separated from the other strip by a spacer layer (14) made of a non-magnetic material, the thickness of which is such that the strips (12, 13) located on either side of the spacer layer (14) are antiferromagnetically coupled.

2. Microcomponent according to claim 1, characterized in that the core comprises a plurality of ferromagnetic strips (12, 13) separated by non-magnetic spacer layers (14), the strips (12, 13) located on either side of each spacer layer (14) being antiferromagnetically coupled.

3. Microcomponent according to claim 1, characterized in that each strip (12, 13) has an easy magnetization axis perpendicular to the axis (20) of the solenoid.

4. Microcomponent according to claim 1, characterized in that at least one spacer layer (14) is made of a conducting material.

5. Microcomponent according to claim 4, characterized in that the material of the spacer layer (14) is chosen from the group comprising copper, gold, silver, chromium and metal alloys based on these metals.

6. Microcomponent according to claim 1, characterized in that at least one spacer layer (14) is made of an insulating material.

* * * * *